(12) United States Patent
Park et al.

(10) Patent No.: US 9,088,685 B2
(45) Date of Patent: Jul. 21, 2015

(54) APPARATUS AND METHOD FOR REMOVING NOISE GENERATED FROM IMAGE SENSOR

(75) Inventors: Min-Kyu Park, Seoul (KR); Han-Sae Song, Seoul (KR); Hee-Chan Park, Seoul (KR); Young-Kwon Yoon, Seoul (KR); Yong-Gu Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 13/640,253

(22) PCT Filed: Apr. 7, 2011

(86) PCT No.: PCT/KR2011/002460
§ 371 (c)(1),
(2), (4) Date: Oct. 9, 2012

(87) PCT Pub. No.: WO2011/126328
PCT Pub. Date: Oct. 13, 2011

(65) Prior Publication Data
US 2013/0027590 A1    Jan. 31, 2013

(30) Foreign Application Priority Data
Apr. 7, 2010    (KR) .................. 10-2010-0031821

(51) Int. Cl.
| H04N 5/217 | (2011.01) |
| H04N 9/04 | (2006.01) |
| G06T 5/00 | (2006.01) |
| H04N 9/64 | (2006.01) |

(52) U.S. Cl.
CPC ................ *H04N 9/045* (2013.01); *G06T 5/002* (2013.01); *H04N 9/646* (2013.01); *G06T 2207/10024* (2013.01)

(58) Field of Classification Search
CPC ......... H04N 1/409; H04N 5/19; H04N 5/217; H04N 5/357; H04N 9/045; H04N 9/646; G06T 5/002; G06T 2267/10024
USPC .................... 348/241, 252; 382/199, 266, 269
See application file for complete search history.

(56) References Cited

U.S. PATENT DOCUMENTS

| 5,373,322 | A | * | 12/1994 | Laroche et al. | ............... 348/273 |
| 6,229,578 | B1 | * | 5/2001 | Acharya et al. | ............... 348/607 |
| 6,904,169 | B2 | * | 6/2005 | Kalevo et al. | ................. 382/167 |
| 7,009,639 | B1 | | 3/2006 | Une et al. | |
| 8,150,407 | B2 | | 4/2012 | Ho et al. | |

(Continued)

FOREIGN PATENT DOCUMENTS

| JP | 2000-341700 A | 12/2000 |
| JP | 2005-311962 A | 11/2005 |

(Continued)

*Primary Examiner* — Lin Ye
*Assistant Examiner* — Chriss Yoder, III
(74) *Attorney, Agent, or Firm* — Jefferson IP Law, LLP (57) ABSTRACT

The present invention provides a method for efficiently removing noise of an image sensor. To this end, the present invention enables: an area to be divided into an edge area, a sensitivity difference generation area, and a pattern area relative to an input image of a Bayer pattern; and different noise removing methods to be applied according to each of the divided areas. By doing this, noise can be removed efficiently since the noise is adaptively removed in each area. Further, sensitivity differences between Gr and Gb are considered in such a manner that resolution can be improved.

14 Claims, 6 Drawing Sheets

(56) References Cited

U.S. PATENT DOCUMENTS

| | | |
|---|---|---|
| 8,259,202 B2 | 9/2012 | Tsukioka |
| 2005/0041116 A1 | 2/2005 | Tsukioka |
| 2006/0238629 A1* | 10/2006 | Sato et al. .................. 348/241 |
| 2007/0109316 A1 | 5/2007 | Fainstain |
| 2007/0127836 A1* | 6/2007 | Subbotin .................. 382/260 |
| 2008/0204572 A1 | 8/2008 | Oizumi |
| 2008/0239121 A1 | 10/2008 | Egawa |
| 2008/0252759 A1* | 10/2008 | Jerdev et al. .............. 348/273 |
| 2009/0041371 A1* | 2/2009 | Hasegawa .................. 382/261 |
| 2010/0110235 A1* | 5/2010 | Higuchi .................... 348/241 |

FOREIGN PATENT DOCUMENTS

| | | |
|---|---|---|
| JP | 2005-328215 A | 11/2005 |
| JP | 2006-013558 A | 1/2006 |
| JP | 2008-252397 A | 10/2008 |
| JP | 2008-252558 A | 10/2008 |
| KR | 10-2005-0104421 A | 11/2005 |
| KR | 10-0866187 B1 | 10/2008 |
| WO | 20071054931 A2 | 5/2007 |

* cited by examiner

| in[h-2][v-2] | in[h-1][v-2] | in[h][v-2] | in[h+1][v-2] | in[h+2][v-2] |
|---|---|---|---|---|
| in[h-2][v-1] | in[h-1][v-1] | in[h][v-1] | in[h+1][v-1] | in[h+2][v-1] |
| in[h-2][v] | in[h-1][v] | in[h][v] | in[h+1][v] | in[h+2][v] |
| in[h-2][v+1] | in[h-1][v+1] | in[h][v+1] | in[h+1][v+1] | in[h+2][v+1] |
| in[h-2][v+2] | in[h-1][v+2] | in[h][v+2] | in[h+1][v+2] | in[h+2][v+2] |

HORIZONTAL-DIRECTION
DIFFERENCE

FIG.4A

VERTICAL-DIRECTION
DIFFERENCE

APPARATUS AND METHOD FOR REMOVING NOISE GENERATED FROM IMAGE SENSOR

TECHNICAL FIELD

The present invention relates to an image processing apparatus and method, and more particularly, to an apparatus and method for canceling noise generated in an image sensor.

BACKGROUND ART

In image apparatuses such as cameras, camcorders, webcams, etc., an image sensor is mounted and the image sensor generally adopts a Bayer pattern configuration. The Bayer pattern refers to a pattern in which a pattern of two colors of Red (R) and Green (Gr) on a row and a pattern of two colors of Green (Gb) and Blue (B) on another row are repetitively arranged, as shown in FIGS. 1A, 1B, 1C, and 1D. As shown in FIGS. 1A, 1B, 1C, and 1D, by using a Bayer color filter, data is obtained in which only one value among Red, Green, and Blue exists in each pixel. Since Green next to Red and Green next to Blue have different sensitivities, the Bayer pattern may be divided as shown in FIGS. 1A, 1B, 1C, and 1D according to four types of center pixels, R, Gr, Gb, and B.

The size of an image sensor does not increase in spite of increase in the number of pixels of the image sensor, such that an area of each pixel relatively decreases. Such decrease in the pixel area reduces a capacity of a photodiode, degrading the sensitivity of the image sensor. To prevent this phenomenon, a recent Complementary Metal Oxide Semiconductor (CMOS) image sensor uses a share structure for increasing the capacity of the photodiode and improving the sensitivity of the image sensor. If a transistor and a drive region are shared, the form and structure of share pixels are asymmetric, causing a signal difference between the share pixels. Such a difference is expressed as noise, which is so-called a "maze effect", after color interpolation.

To cancel the noise, noise cancellation algorithms have been studied. One of them is the most common noise cancellation method which uses a weighted mean filter. This noise cancellation method cancels noise by being applied to pixels of the same type as the center pixel. Assuming channels of Gr and Gb are the same channel, noise and errors related to channel sensitivity are removed at the same time.

DISCLOSURE

Technical Problem

As described above, in the Bayer pattern as shown in FIGS. 1A, 1B, 1C, and 1D, an R, Gr pixel row and a B, Gb pixel row are alternately arranged, such that the number of Green pixels is two times the number of Red, Blue pixels. However, since the conventional noise cancellation method assumes that the channels of Gr and Gb are the same channel, a channel sensitivity related error is not easily removed in a flat region, and an edge is damaged in an edge region, resulting in inefficiency in noise cancellation.

The foregoing conventional noise cancellation method fails to consider a sensitivity difference between Gr and Gb. When color interpolation is performed without considering the problem of the sensitivity difference between Gr and Gb, neighboring values all are affected, degrading display quality due to an undesired artifact in a resulting image. Such a phenomenon is prominent especially in a direction-oriented color interpolation algorithm. The sensitivity difference between Gr and Gb is a main cause for degradation of an image resolution, and the degradation of the image resolution often occurs mainly in a cellular phone's camera sensor whose image sensor is relatively small. Therefore, a noise cancellation method considering the sensitivity difference between Gr and Gb is required.

Technical Solution

Accordingly, an aspect of embodiments of the present invention is to provide an apparatus and method for efficiently cancelling noise generated in an image sensor.

Another aspect of embodiments of the present invention is to provide an apparatus and method for canceling noise by considering a sensitivity difference between Gr and Gb.

Another aspect of embodiments of the present invention is to provide an apparatus and method for canceling noise in an image sensor without a need for additional hardware.

In accordance with an embodiment of the present invention, there is provided a method for cancelling noise generated in an image sensor, the method including determining a center pixel for an input image in a Bayer pattern in the unit of a predetermined mask, if the center pixel is a G1 pixel or G2 pixel which belongs to Green, comparing a difference between an average of G1 pixels which are the same as the G1 center pixel and an average of G2 pixels which are different from the G1 center pixel with a predetermined sensitivity difference threshold value, if the difference between the averages is less than the sensitivity difference threshold value, removing a sensitivity difference between the G1 pixel and the G2 pixel, and if the difference between the averages is greater than the sensitivity difference threshold value, removing a directivity edge.

In accordance with another embodiment of the present invention, there is provided an apparatus for canceling noise generated in an image sensor, the apparatus including a center pixel determiner for determining a center pixel for an input image in a Bayer pattern in the unit of a predetermined mask, a sensitivity determiner for, if the center pixel is a G1 pixel or G2 pixel which belongs to Green, comparing a difference between an average of G1 pixels which are the same as the G1 center pixel and an average of G2 pixels which are different from the G1 center pixel with a predetermined sensitivity difference threshold value, a sensitivity difference corrector for, if the difference between the averages is less than the sensitivity difference threshold value, removing a sensitivity difference between the G1 pixel and the G2 pixel, and a directivity edge noise cancellation filter for, if the difference between the averages is greater than the sensitivity difference threshold value, removing a directivity edge.

Advantageous Effects

According to the present invention, by using a Bayer pattern, an image is divided into an edge region, a flat region, and a pattern region, and different noise cancellation schemes are applied to the divided regions, respectively, thereby efficiently canceling noise generated in an image sensor. Moreover, by determining a sensitivity difference between Gr and Gb, channel sensitivity can be corrected in a region where the sensitivity difference occurs, that is, in a flat region, thereby preventing resolution degradation. Furthermore, the present invention uses noise cancellation after modeling the sensitivity difference between Gr and Gb as noise, thereby correcting the sensitivity difference between Gr and Gb without a need for additional hardware.

BEST MODE

Reference will now be made in detail to the preferred embodiments of the present invention with reference to the accompanying drawings. In the following description of the present invention, a detailed description of related well-known functions or structures will not be provided if it unnecessarily obscure the subject matter of the present invention.

The present invention proposes a method for efficiently canceling noise of an image sensor. To this end, the present invention divides an input image in a Bayer pattern into an edge region, a sensitivity-difference-generated region, and a pattern region, and then applies different noise cancellation schemes to the divided regions, respectively. By doing so, noise can be cancelled adaptively for each region, thereby efficiently cancelling noise. Moreover, since a sensitivity difference between Gr and Gb is considered, resolution is improved.

Before undertaking the description of the present invention, a Bayer pattern and a mask used in the present invention will be briefly described with reference to FIGS. 1A, 1B, 1C, 1D, and 2.

Figure 1A:
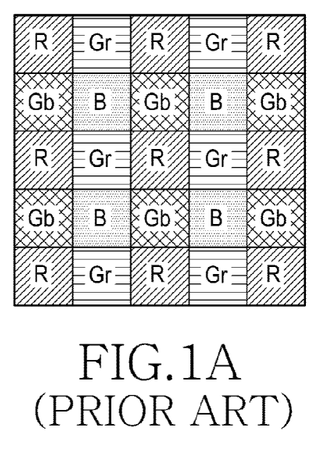
FIGS. 1A, 1B, 1C, and 1D are exemplary diagrams of a Bayer pattern according to the prior art.
Figure 1B:
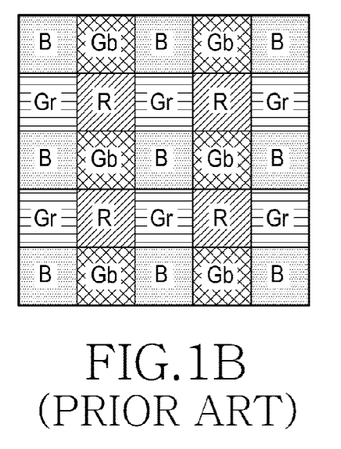
Figure 1C:
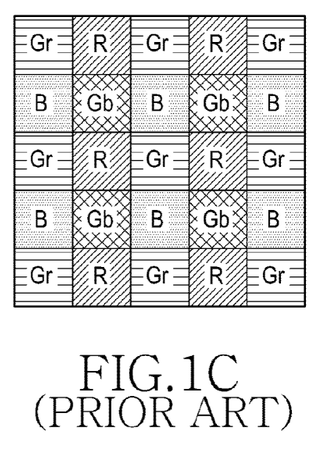
Figure 1D:
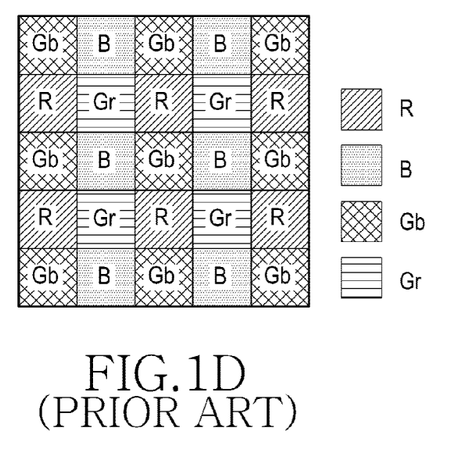
Figure 2:
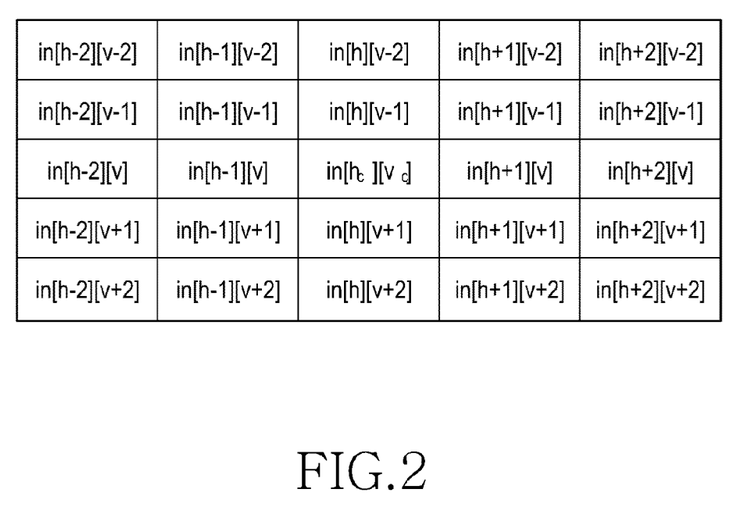
FIG. 2 is an exemplary diagram of a 5×5 mask used in the present invention.

The Bayer pattern may be divided into four types as shown in FIGS. 1A, 1B, 1C, and 1D. The present invention proposes a method for canceling noise from an input image upon input of the image having the Bayer pattern divided into four types. FIG. 2 shows a mask having a size of 5×5. Referring to FIG. 2, in the 5×5 mask, r indicates vertical-axis coordinates, c indicates horizontal-axis coordinates, and in $[h_c][v_c]$ indicates a center pixel of the 5×5 mask. Comparing the Bayer pattern of FIGS. 1A, 1B, 1C, and 1D with the mask of FIG. 2, the center pixel in $[h_c][v_c]$ indicates any one of R, Gr, B, and Gb.

In the present invention, noise is canceled considering a sensitivity difference between Gr and Gb, such that it is necessary to first determine whether a center pixel is one of pixels belonging to Green, that is, Gr or Gb or is a Red or Blue pixel.

Hereinafter, referring to FIG. 3, a description will be made of components and operations of an apparatus for canceling noise to cancel noise and correct sensitivity for the input Bayer pattern as shown in FIGS. 1A, 1B, 1C, and 1D, by using the 5×5 mask shown in FIG. 2.

Figure 3:
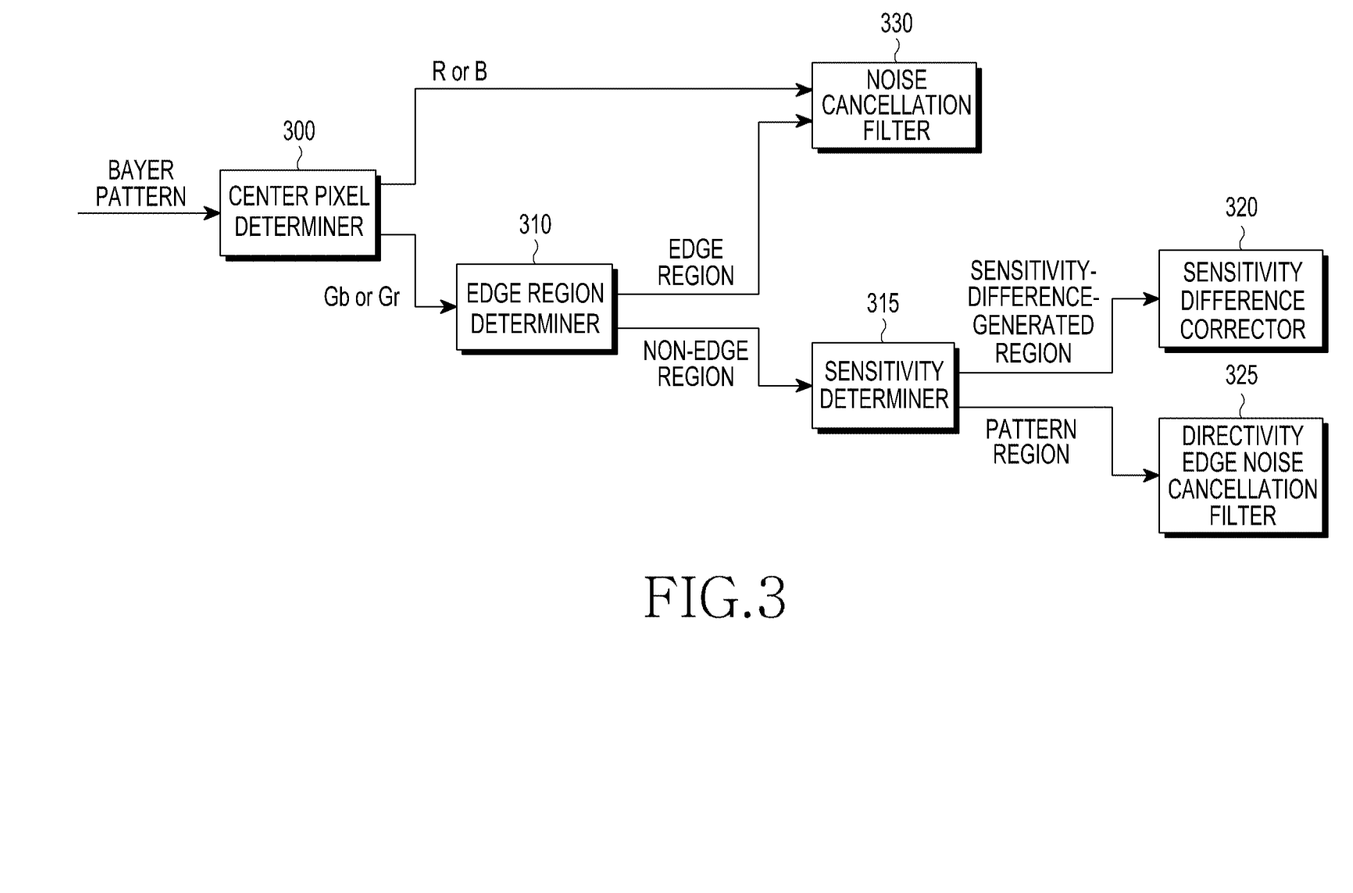
FIG. 3 is an internal block diagram of an apparatus for canceling noise according to an exemplary embodiment of the present invention.

Referring to FIG. 3, an apparatus for canceling noise according to an embodiment of the present invention may include a center pixel determiner 300, an edge region determiner 310, a sensitivity determiner 315, a sensitivity difference corrector 320, a directivity edge noise cancellation filter 325, and a noise cancellation filter 330.

The center pixel determiner 300 determines a type of a center pixel in the unit of a predetermined mask, upon input of an image in a Bayer pattern. In an embodiment of the present invention, a mask size is assumed to be 5×5. In this case, the center pixel determiner 300 determines a type of a center pixel in the unit of a 5×5 mask for an input image, such that center pixels for a plurality of image regions can be obtained for each mask unit. Thus, in the following description, edge region determination and sensitivity determination with respect to the input image are also performed in the unit of a predetermined mask.

If the center pixel determiner 300 determines that the center pixel is Green, i.e., Gr or Gb, the edge region determiner 310 determines whether the mask region is an edge region. On the other hand, if the center pixel is R or B, the noise cancellation filter 330 performs noise cancellation with respect to the mask region.

Figure 4A:
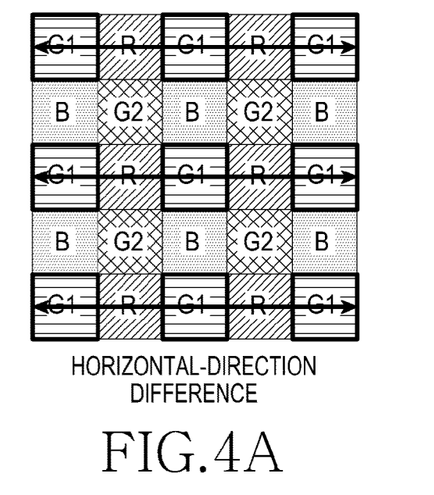
FIGS. 4A and 4B are exemplary diagrams for describing determination of an edge region according to an exemplary embodiment of the present invention.
Figure 4B:
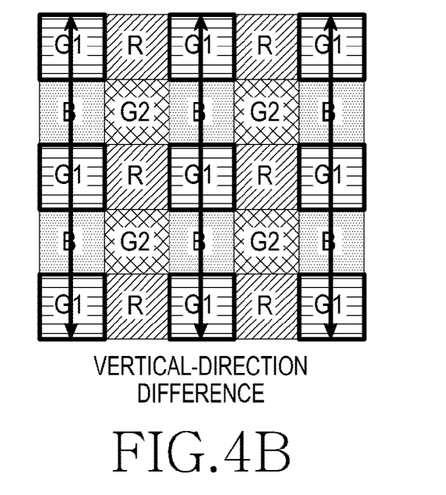

The edge region determiner 310 determines whether the mask region is an edge region, as will be described in detail with reference to FIGS. 4A and 4B. FIG. 4A shows a scheme for calculating a difference in a horizontal direction, and FIG. 4B shows a scheme for calculating a difference in a vertical direction. In FIGS. 4A and 4B, Green in the center pixel is defined as G1 and Green adjacent to the center pixel is defined as G2. That is, if the center pixel is Gr, G1 means Gr and G2 means Gb. On the other hand, if the center pixel is Gb, G1 means Gb and G2 means Gr.

The edge region determiner 310 calculates an absolute value of a horizontal-direction difference as in FIG. 4A and an absolute value of a vertical-direction difference as in FIG. 4B. In other words, a difference of G1 pixels in odd-numbered rows and a difference of G2 pixels in even-numbered rows are calculated, and then absolute values of the two differences are obtained.

An equation for calculating an absolute value of a horizontal-direction difference is Equation 1, and an equation for calculating an absolute value of a vertical-direction difference is Equation 2.

$$Hdiff[h_c][v_c] = \qquad\qquad\qquad\text{[Equation 1]}$$
$$\frac{1}{6}\sum_{\substack{h=-2,0,2\\v=-2,0}}|\text{input}[h_c+h][v_c+v]-\text{input}[h_c+h][v_c+v+2]|$$

In Equation 1, Hdiff is an absolute value of a horizontal-direction difference and represents a size of an edge in the horizontal direction.

$$Vdiff[h_c][v_c] = \qquad\qquad\qquad\text{[Equation 2]}$$
$$\frac{1}{6}\sum_{\substack{h=-2,0,2\\v=-2,0}}|\text{input}[h_c+h][v_c+v]-\text{input}[h_c+h+2][v_c+v]|$$

In Equation 2, Vdiff is an absolute value of a vertical-direction difference and represents a size of an edge in the vertical direction.

When the horizontal-direction absolute value Hdiff and the vertical-direction absolute value Vdiff are obtained using Equation 1 and Equation 2, the edge region determiner 310 compares the greater value between the two absolute values with an edge region threshold value to minimize an influence of noise for detection of an edge region. If the greater value between the two absolute values is greater than the edge region threshold value, the edge region determiner 310 determines that the mask region is an edge region. On the other hand, if the greater value is less than the edge region threshold value, the edge region determiner 310 determines that the mask region is not an edge region, as will be expressed by Equation 3.

[Equation 3]

if (MAX(Hdiff,Vdiff) > $th_H$){
    Determine as edge region
}
else{
    Determine as non - edge region
}

In Equation 3, $th_H$ is an edge region threshold value, and MAX(Hdiff, Vdiff) is an equation for selecting the greater value between Hdiff and Vdiff.

The reason why the edge region determiner 310 determines the mask region as an edge region or a non-edge region is to prevent degradation of a resolution in the edge region.

If the mask region is determined as the edge region, like when the center pixel is R or B, the noise cancellation filter 330 performs noise cancellation with respect to the mask region, as will be described in detail below.

If the mask region is determined as the non-edge region, the sensitivity determiner 315 determines whether the mask region is a sensitivity-difference-generated region or a pattern region. Herein, the sensitivity-difference-generated region is a region where a sensitivity difference between Gb and Gr occurs, and may be defined as a flat region. The pattern region refers to a region where a thin edge is repeated. The sensitivity-difference-generated region and the pattern region are not distinguished merely by edge detection. The pattern region and the sensitivity-difference-generated region have similar characteristics, such that to prevent degradation of a resolution of an input image, the two regions need to be distinguished.

Figure 5A:
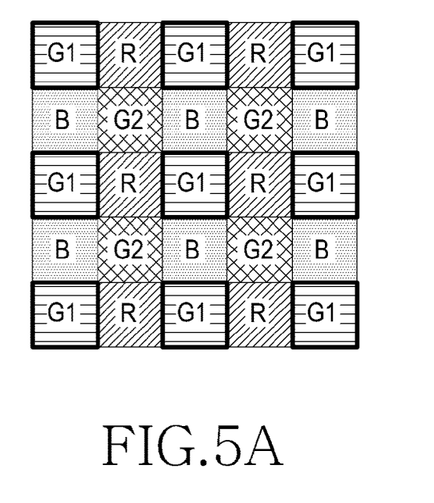
FIGS. 5A and 5B are exemplary diagrams for describing determination of a sensitivity region according to an exemplary embodiment of the present invention.
Figure 5B:
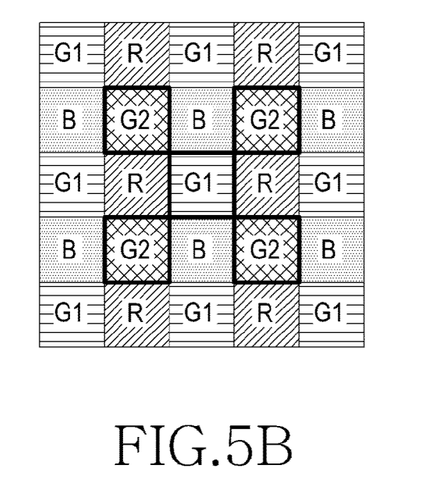

Therefore, the sensitivity determiner 315 according to an embodiment of the present invention determines whether the region determined as the non-edge region is the sensitivity-difference-generated region or the pattern region. When the center pixel is the G1 pixel or the G2 pixel belonging to Green, the sensitivity determiner 315 compares a difference between an average of G1 pixels which are the same as the G1 center pixel and an average of G2 pixels which are different from the G1 center pixel with a predetermined sensitivity difference threshold value, to determine whether the non-edge region is the sensitivity-difference-generated region or the pattern region. FIGS. 5A and 5B will now be referred to for detailed description of a process of distinguishing the two regions. FIG. 5A shows a scheme for calculating an average of Green pixels which are the same as the center pixel, and FIG. 5B shows a scheme for calculating an average of Green pixels which are different from the center pixel.

When the center pixel is G1 in FIG. 5A, Green pixels which are the same as the center pixel may also be G1 and an average of G1 can be calculated by Equation 4.

$$Avg1 = \frac{1}{9} \sum_{k,v=-2,0,2} input[h_c + h][v_c + v]$$ [Equation 4]

In Equation 4, Avg1 represents an average of Green pixels which are the same as the center pixel. If the center pixel G1 is Gb (or Gr) in FIG. 5A, the Green pixels which are the same as the center pixel may also be Gb (or Gr). Therefore, by using Equation 4, an average of 9 Gb (or Gr) pixels of the mask region can be obtained.

If the center pixel is G in FIG. 5B, the Green pixels which are different from the center pixel may be G2 adjacent to the center pixel, and an average of G2 can be obtained by Equation 5.

$$Avg2 = \frac{1}{4} \sum_{h,v=-1,1} input[h_c + h][v_c + v]$$ [Equation 5]

In Equation 5, Avg2 represents an average of Green pixels which are different from the center pixel. If the center pixel G is Gb (or Gr) in FIG. 5B, the adjacent Green pixels G2 which are different from the center pixel may be Gr (or Gb).

Therefore, a sensitivity difference between Gr and Gb is a difference between the average Avg1 of G1 and the average Avg2 of G2. An equation for determining the sensitivity-difference-generated region or the pattern region by using the sensitivity difference between Gr and Gb is given by Equation 6.

[Equation 6]

if (|Avg – Avg2| < $th_{CSC}$){
    Sensitivity Difference Generation region
}
else{
    Pattern region
}

In Equation 6, $th_{CSC}$ refers to a sensitivity difference threshold value.

Thus, the sensitivity determiner 315 determines that the mask region is the sensitivity-difference-generated region if a sensitivity difference between Gr and Gb is less than the predetermined sensitivity difference threshold value $th_{CSC}$; if the sensitivity difference is greater than the sensitivity difference threshold value $th_{CSC}$, the sensitivity determiner 315 determines that the mask region is the pattern region.

As described above, the mask region of the input image corresponds to one of the edge region, the sensitivity-difference-generated region, and the pattern region. For such distinguishment, Equation 3 and Equation 6 can be rewritten as one equation as follows:

[Equation 7]

if (MAX(Hdiff,Vdiff) > $th_H$){
    Determine as edge region
}
else{
    if (|Avg – Avg2| < $th_{CSC}$){
        Sensitivity Difference Generation region
    }
    else{
        Pattern region
    }
}

Once a region to which the mask region belongs is distinguished in the unit of a mask as in Equation 7, the noise cancellation filter 330 performs noise cancellation with respect to the edge region in such a way to leave an edge to the maximum. For the sensitivity-difference-generated region, the sensitivity difference corrector 320 also corrects a sensitivity difference simultaneously with noise cancellation. For the pattern region, the directivity edge noise cancellation filter 325 performs noise cancellation in such a way not to damage thin edges. In this way, by applying noise cancellation adaptively to each region, noise can be efficiently canceled and a sensitivity difference may also be corrected.

Figure 6:
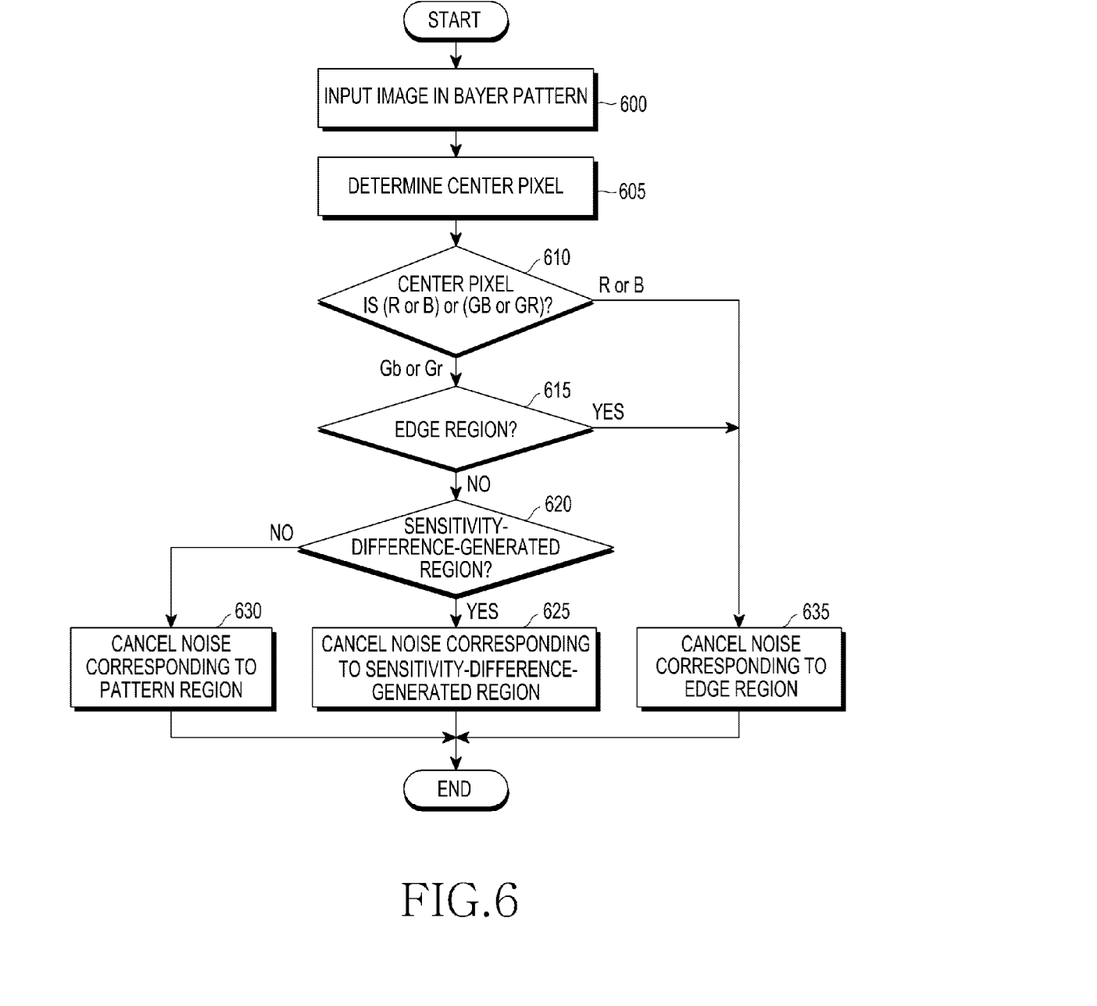
FIG. 6 is a flowchart of operations of an apparatus for canceling noise according to an exemplary embodiment of the present invention.

An operating process of the apparatus for canceling noise structured as described above will be described with reference to FIG. 6. Referring to FIG. 6, upon input of an image in a Bayer pattern in step 600, the apparatus for canceling noise determines a center pixel in the unit of a mask in step 605. In step 610, the apparatus determines whether the center pixel of the mask region is Green. That is, the apparatus determines whether the center pixel is one of R and B or one of Gr and Gb. If the center pixel is Green, that is, Gr or Gb, the apparatus determines whether the mask region is the edge region in step 615. If the mask region is the edge region, the apparatus goes to step 635 to perform noise cancellation with respect to the edge region like when the center pixel is R or B in step 610.

On the other hand, if the mask region is a non-edge region in step 615, the apparatus goes to step 620 to determine whether the non-edge region is the sensitivity-difference-generated region. If the non-edge region is the sensitivity-difference-generated region, the apparatus goes to step 625 to perform noise cancellation corresponding to the sensitivity-difference-generated region. On the other hand, if the non-edge region is not the sensitivity-difference-generated region, the apparatus regards the non-edge region as the pattern region and performs noise cancellation corresponding to the pattern region in step 630.

Figure 7:
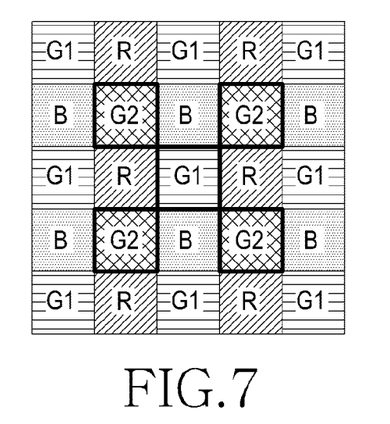
FIG. 7 is an exemplary diagram for describing operations of a sensitivity difference corrector according to an exemplary embodiment of the present invention.
Figure 8:
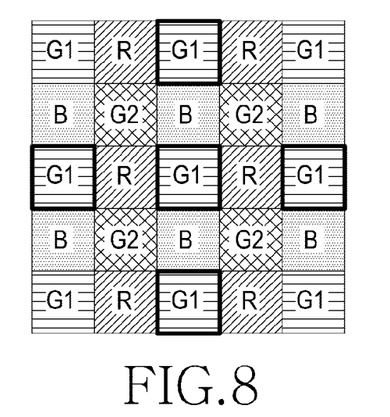
FIG. 8 is an exemplary diagram for describing operations of a directivity edge noise filter according to an exemplary embodiment of the present invention.
Figure 9:
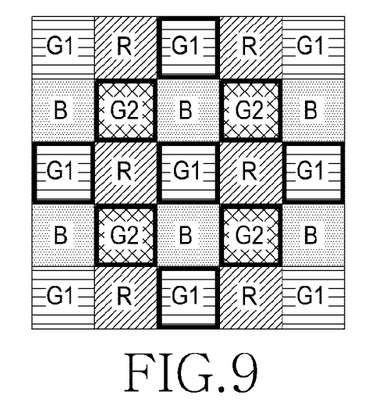
FIG. 9 is an exemplary diagram for describing operations of a noise cancellation filter according to an exemplary embodiment of the present invention.

Different noise cancellation schemes are applied to the distinguished regions as will be described in detail with reference to FIGS. 7 through 9. FIG. 7 is an exemplary diagram for describing a noise cancellation scheme corresponding to the sensitivity-difference-generated region, and noise cancellation and sensitivity difference correction are performed by the sensitivity difference corrector 320.

When the non-edge region is determined as the sensitivity-difference-generated region, a sensitivity difference between Gb and Gr is larger than another region, e.g., the edge region or the pattern region. Therefore, such a sensitivity difference is corrected by using a weighted average of the center pixel and Green pixels which are different from the center pixel. That is, noise is cancelled through such sensitivity difference correction.

Referring to FIG. 7, when the center pixel is G, the Green pixels which are different from the center pixel may be G2.

$$\text{output}_{CSC}[h_c][v_c] = \frac{\text{input}[h_c][v_c] + \bar{t}[h_c][v_c]}{2} \quad \text{[Equation 8]}$$

In Equation 8, $\text{output}_{CSC}$ represents an output after sensitivity difference correction; $\text{input}[h_c][v_c]$ represents the center pixel G1 in FIG. 7; and $\bar{t}[h_c][v_c]$ represents a weighted sum of G2, such that $\text{output}_{CSC}$ is an average of the center pixel G1 and the weighted sum of G2.

$\bar{t}[h_c][v_c]$ can be obtained by Equation 9.

$$\bar{t}[h_c][v_c] = \frac{\sum_{h,v=-1,1} w_{CSC}[h][v] \times \text{input}[h_c + h][v_c + v]}{\text{nor}_{CSC}} \quad \text{[Equation 9]}$$

In Equation 9, $w_{CSC}[h][v]$ is given by Equation 10, and $\text{nor}_{CSC}$ is given by Equation 11.

$$w_{CSC}[h][v] = \quad \text{[Equation 10]}$$
$$\frac{1}{1 + |\text{input}[h_c + h][v_c + v] - \text{input}[h_c - h][v_c - v]| + \text{input}[h_c][v_c] - \text{input}[h_c + 2 \times h][v_c + 2 \times v]}$$

$$\text{nor}_{CSC} = \sum_{h,v=-1,1} w_{CSC}[h][v] \quad \text{[Equation 11]}$$

Noise cancellation in the sensitivity-difference-generated region, that is, the flat region refers to correction of the sensitivity difference between Gr and Gb, which is also called Channel Sensitivity Correction (CSC).

Noise cancellation corresponding to the pattern region is performed by the directivity edge noise cancellation filter 325, and an operation thereof will be described with reference to FIG. 8. The pattern region refers to a region in which a vertical-direction or horizontal-direction edge is repeated; when the center pixel is G1, the original information may be seriously damaged if information of G2 is used. Therefore, in the pattern region, as shown in FIG. 8, only a vertical-direction or horizontal-direction value of the center pixel G1 is used. Thus, resolution degradation of a high-resolution portion of the input image can be prevented.

$$\text{output}_P[h_c][v_c] = \begin{cases} \text{output}_H[h_c][v_c] & \text{if } Hdiff < Vdiff \\ \text{output}_V[h_c][v_c] & \text{otherwise} \end{cases} \quad \text{[Equation 12]}$$

In Equation 12, $\text{output}_H[h_c][v_c]$ and $\text{output}_v[h_c][v_c]$ are given by Equation 13 and Equation 14. In Equation 12, when Hdiff representing a size of a horizontal-direction edge is less than Vdiff representing a size of a vertical-direction edge, it means that there is only the vertical-direction edge. In this case, only horizontal-direction correction has to be performed. On the other hand, when Hdiff is not less than Vdiff; it means that there is only the horizontal-direction edge. In this case, only vertical-direction correction has to be performed.

Therefore, to obtain $\text{output}_P[h_c][v_c]$ representing an output value after noise cancellation in the pattern region, any one of the horizontal-direction value of the center pixel G1 and the vertical-direction value of the center pixel G1 is used. More specifically, referring to FIG. 8, the horizontal-direction value of the center pixel G1 is an average of G1 pixels in the horizontal direction with respect to the center pixel G1, and means an output value after horizontal-direction correction. Likewise, the vertical-direction value of the center pixel G1 is an average of G1 in the vertical direction with respect to the center pixel, and means an output value after vertical-direction correction. For example, when only horizontal-direction correction is performed, $\text{output}_P[h_c][v_c]$ is $\text{output}_H[h_c][v_c]$.

The output value $\text{output}_H[h_c][v_c]$ after only horizontal-direction correction can be expressed as Equation 13. The output value $\text{output}_v[h_c][v_c]$ after only vertical-direction correction can be expressed as Equation 14.

$$\text{output}_H[h_c][v_c] = \frac{\sum_{h=-1,0,1} w_P[h] \times \text{input}[h_c + 2 \times h][v]}{\sum_{h=-1,0,1} w_P[h]}$$ [Equation 13]

$$\text{output}_V[h_c][v_c] = \frac{\sum_{v=-1,0,1} w_P[v] \times \text{input}[h_c][v_c + 2 \times v]}{\sum_{v=-1,0,1} w_P[v]}$$ [Equation 14]

In Equation 14, $w_P[h]$ and $w_P[v]$ are given by Equation 15 and Equation 16.

$$w_P[h] = \frac{1}{1 + |\text{input}[h_c + 2 \times h][v_c] - \text{input}[h_c][v_c]|}$$ [Equation 15]

$$w_P[v] = \frac{1}{1 + |\text{input}[h_c][v_c + 2 \times v] - \text{input}[h_c][v_c]|}$$ [Equation 16]

As such, since the pattern region has directivity, G1 is corrected by using an average in one of the vertical direction and the horizontal direction.

Noise cancellation corresponding to the edge region is performed by the noise cancellation filter 330, and an operation of the noise cancellation filter 330 will be described with reference to FIG. 9. Herein, the noise cancellation filter 330 performs noise cancellation as follows, when the center pixel is R or B or when the mask region is determined as the edge region even if the center pixel is Green.

An output value after noise cancellation with respect to the edge region may be expressed as Equation 17.

$$\text{output}[h_c][v_c] = (1-w_n) \times \text{output}_{Edge}[h_c][v_c] + w_n \times \text{output}_{NonEdge}[h_c][v_c]$$ [Equation 17]

In Equation 17, $w_n$ may be expressed as Equation 18. $\text{output}_{Edge}[h_c][v_c]$ and $\text{output}_{Nonedge}[h_c][v_c]$ may be expressed as Equation 19 and Equation 20, respectively.

$$w_n = \begin{cases} 1 & \text{if } \text{MAX}\begin{pmatrix} Hdiff[h_c][v_c], \\ Vdiff[h_c][v_c] \end{pmatrix} < th_L \\ \dfrac{th_H - \text{MAX}(Hdiff[h_c][v_c], Vdiff[h_c][v_c])}{th_H - th_L} & \text{else if } th_L < \text{MAX}\begin{pmatrix} Hdiff[h_c][v_c], \\ Vdiff[h_c][v_c] \end{pmatrix} < th_H \\ 0 & \text{else} \end{cases}$$ [Equation 18]

In Equation 18, $th_H$ and $th_L$ represent predefined threshold values. Herein, MAX(Hdiff[$h_c$][$v_c$], Vdiff[$h_c$][$v_c$]) represents the greater value between Hdiff representing the size of the horizontal-direction edge and Vdiff representing the size of the vertical-direction edge. When the greater value between Hdiff and Vdiff is less than $th_L$, it means that a corresponding portion is a non-edge portion. In this case, $w_n$ is 1, and when $w_n$ having a value of 1 is substituted into Equation 17, $\text{output}_{Edge}[h_c][v_c]$ is 0, such that the output value output[$h_c$][$v_c$] after noise cancellation with respect to the edge region is $\text{output}_{Nonedge}[h_c][v_c]$.

On the other hand, when the greater value between Hdiff and Vdiff is greater than $th_H$, it means that a corresponding portion is an edge portion. In this case, $w_n$ is 0, and when $w_n$ having a value of 0 is substituted into Equation 17, $\text{output}_{Nonedge}[h_c][v_c]$ is 0, such that the output value output[$h_c$][$v_c$] after noise cancellation with respect to the edge region is $\text{output}_{Edge}[h_c][v_c]$. Herein, $\text{output}_{Edge}[h_c][v_c]$ can be obtained using Equation (19), and $\text{output}_{Nonedge}[h_c][v_c]$ can be obtained using Equation 20.

$$\text{output}_{Edge}[h_c][v_c] = \text{output}_P[h_c][v_c]$$ [Equation 19]

In Equation 19, in case of an edge portion, the output value $\text{output}_{Edge}[h_c][v_c]$ is $\text{output}_P[h_c][v_c]$ representing an output value after noise cancellation with respect to the pattern region in Equation 12. That is, to obtain $\text{output}_{Edge}[h_c][v_c]$, as described with reference to Equation 12, any one of the horizontal-direction value 20 of the center pixel G1 and the vertical-direction value of the center pixel G1 is used. Thus, referring to FIG. 9, an average of G1 in the horizontal direction with respect to the center pixel G1 or an average of G1 in the vertical direction with respect to the center pixel G1 is used.

On the other hand, in case of a non-edge portion, the output value $\text{output}_{Nonedge}[h_c][v_c]$ is given by Equation 20.

$$\text{output}_{Nonedge}[h_c][v_c] = \frac{\sum_{h,v} w_{Nonedge}[h][v] \times \text{input}[h_c + h][v_c + v]}{nor_{Nonedge}}$$ [Equation 20]

In Equation 20, $w_{Nonedge}[h][v]$ and $nor_{Nonedge}$, may be expressed as Equation 21 and Equation 22, respectively. Thus, referring to FIG. 9, a weighted average of G2 adjacent to the center pixel G1 is used.

Herein, h and v vary according to the center pixel. When the center pixel is G1, h and v have 13 values, (−2, −2), (−2, 0), (−2, 2), (0, −2), (0, 0), (0, 2), (2, −2), (2, 0), (2, 2), (−1, −1), (−1, 1), (1, −1), and (1, 1); when the center pixel is R or B, h and v have 9 values, (−2, −2), (−2, 0), (−2, 2), (0, −2), (0, 0), (0, 2), (2, −2), (2, 0), and (2, 2).

$$w_{Nonedge}[h][v] = \frac{1}{1 + |\text{input}[h_c][v_c] - \text{input}[h_c + h][v_c + v]|}$$ [Equation 21]

$$nor_{Nonedge} = \sum_{h,v=-1,1} w_{Nonedge}[h][v]$$ [Equation 22]

As such, when the mask region is the edge region or when the center pixel is not Green, G1 is corrected by using an average in the vertical direction or the horizontal direction or by using a weighted sum of G2 values.

As described above, according to the present invention, a sensitivity difference between Gr and Gb can be corrected in the flat region, such that an error related to channel sensitivity can be easily removed, and for an edge region, noise can be canceled without damaging an edge, thereby efficiently canceling noise.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A method for cancelling noise generated in an image sensor, the method comprising:
   determining a center pixel for an input image in a Bayer pattern in the unit of a predetermined mask;
   if the center pixel is a G1 pixel which belongs to Green, calculating a size of an edge in a horizontal direction and a size of an edge in a vertical direction;
   comparing a greater value between the calculated size of the edge in the horizontal direction and the calculated size of the edge in the vertical direction with a predetermined edge region threshold value;
   if the greater value is less than the edge region threshold value, comparing a difference between an average of G1 pixels which are the same as the G1 center pixel and an average of G2 pixels which are different from the G1 center pixel with a predetermined sensitivity difference threshold value;
   if the difference between the averages is less than the sensitivity difference threshold value, removing a sensitivity difference between the G1 center pixel and the G2 pixels; and
   if the difference between the averages is greater than the sensitivity difference threshold value, removing a directivity edge,
   wherein the removing of the directivity edge comprises:
      if the difference between the averages is greater than the sensitivity difference threshold value, determining that a mask region is a pattern region; and
      performing noise cancellation with respect to the pattern region by using any one of an average of G1 pixels in the horizontal direction with respect to the G1 center pixel and an average of G1 pixels in the vertical direction with respect to the G1 center pixel.

2. The method of claim 1, wherein if the G1 pixel is Gb, the G2 pixel is Gr, and if the G1 pixel is Gr, the G2 pixel is Gb.

3. The method of claim 1, wherein the removing of the sensitivity difference between the G1 center pixel and the G2 pixels comprises:
   if the difference between the averages is less than the sensitivity difference threshold value, determining that a mask region is a sensitivity-difference-generated region; and
   canceling noise from the sensitivity-difference-generated region by using an average of a value of the G1 center pixel and a weighted sum of the G2 pixels.

4. The method of claim 1, wherein the performing of the noise cancellation with respect to the pattern region comprises:
   if the size of the edge in the horizontal direction is less than the size of the edge in the vertical direction, performing the noise cancellation by using an average of the G1 pixels in the horizontal direction.

5. The method of claim 1, wherein the performing of the noise cancellation with respect to the pattern region comprises:
   if the size of the edge in the horizontal direction is greater than the size of the edge in the vertical direction, performing the noise cancellation by using an average of the G1 pixels in the vertical direction.

6. The method of claim 1, further comprising:
   if the greater value is greater than the edge region threshold value, determining that a corresponding region is an edge region; and
   performing noise cancellation with respect to the edge region by using any one of an average of G1 pixels in the horizontal direction with respect to the G1 center pixel and an average of G1 pixels in the vertical direction.

7. The method of claim 1, further comprising:
   if the center pixel is a Red or Blue pixel, canceling noise by using of a weighted sum of the G2 pixels.

8. An apparatus for canceling noise generated in an image sensor, the apparatus comprising:
   an image sensor configured to generating an image;
   a processor configured to:
      determine a center pixel for the image in a Bayer pattern in the unit of a predetermined mask;
      if the center pixel is a G1 pixel which belongs to Green, calculate a size of an edge in a horizontal direction and a size of an edge in a vertical direction;
      compare a greater value between the calculated size of the edge in the horizontal direction and the calculated size of the edge in the vertical direction with a predetermined edge region threshold value;
      if the greater value is less than the edge region threshold value, compare a difference between an average of G1 pixels which are the same as the G1 center pixel and an average of G2 pixels which are different from the G1 center pixel with a predetermined sensitivity difference threshold value;
      if the difference between the averages is less than the sensitivity difference threshold value, remove a sensitivity difference between the G1 center pixel and the G2 pixels; and
      if the difference between the averages is greater than the sensitivity difference threshold value, remove a directivity edge, wherein when removing the directivity edge, the processor is configured to:
      if the difference between the averages is greater than the sensitivity difference threshold value, determine that a mask region is a pattern region; and
      perform noise cancellation with respect to the pattern region by using any one of an average of G1 pixels in the horizontal direction with respect to the G1 center pixel and an average of G1 pixels in the vertical direction with respect to the G1 center pixel.

9. The apparatus of claim 8, wherein if the G1 pixel is Gb, the G2 pixel is Gr, and if the G1 pixel is Gr, the G2 pixel is Gb.

10. The apparatus of claim 8, wherein the processor is configured to cancel noise from the sensitivity-difference-generated region by using an average of a value of the G1 center pixel and a weighted sum of the G2 pixels.

11. The apparatus of claim 8, wherein the processor is configured to perform noise cancellation with respect to the pattern region by using any one of an average of G1 pixels in the horizontal direction with respect to the G1 center pixel and an average of G1 pixels in the vertical direction with respect to the G1 center pixel.

12. The apparatus of claim 11, wherein the processor is configured to perform the noise cancellation by using an average of the G1 pixels in the horizontal direction, if the size of the edge in the horizontal direction is less than the size of the edge in the vertical direction.

13. The apparatus of claim 8, wherein
   if the greater value is greater than the edge region threshold value, the processor is configured to determine that a corresponding region is an edge region and performing noise cancellation with respect to the edge region by using any one of an average of G1 pixels in the horizontal direction with respect to the G1 center pixel and an average of G1 pixels in the vertical direction.

14. The apparatus of claim 13, wherein the processor is configured to cancel noise by using a weighted sum of the G2 pixels if the center pixel is a Red or Blue pixel.

* * * * *